3,145,240
INJECTION MOLDING OF FOAM POLYMERIC
STRUCTURES
Victor W. Proulx, Pittsburgh, Pa., and Gerald F. Lafferty,
North Leominster, Mass., assignors to Koppers Company, Inc., a corporation of Delaware
Filed Aug. 7, 1961, Ser. No. 129,595
5 Claims. (Cl. 264—53)

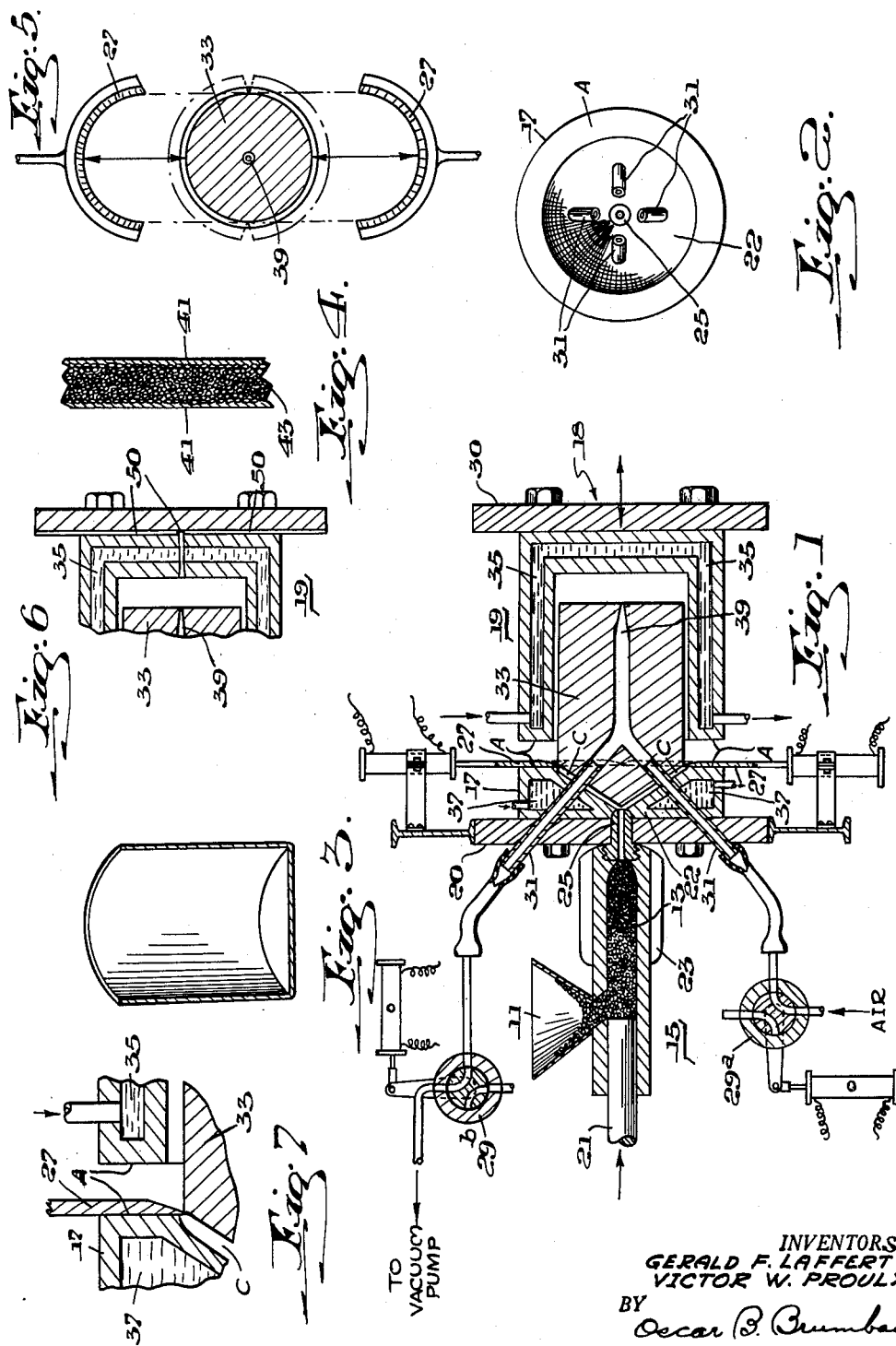

This invention relates generally to the injection molding of articles having a foam polymeric structure, and more particularly, to a novel mold for attachment to an injection molding machine for the production of receptacles having a foam polymeric structure.

Articles such as insulation board, toys, novelties, etc. having a foamed polymeric structure are conveniently made from expandable polymeric particles. Expandable polymeric particles are available from several manufacturers. Such particles are of a thermoplastic polymeric or resinuous material which has a gaseous gas-generating substance or liquid dissolved or otherwise incorporated in the material as a blowing agent. When the particles are heated, the particles soften and the blowing agent vaporizes expanding the particles from ten to thirty times their original volume. Expandable polystyrene, for example, is sold under the trademark "Dylite" and contains from five to fifteen parts by weight of a low boiling hydrocarbon. Articles having a foamed polymeric structure are usually made by placing expandable polymeric particles in a mold which is not gas-tight and which has a desired configuration, and then heating the particles so that the particles expand to conform to the shape of the mold, coalesce and fuse toegther to form a solid, cellular foam structure that has the shape of the mold.

It is particularly desirable to produce receptacles, such as drinking cups, from a foam polymeric material. The insulating effect of the foam structure enables the container to hold hot liquids without burning the handler's fingers or to maintain the low temperature of a cold liquid for a considerable period of time. The production of such cups by a conventional individual molding operation such, for example, as described in Stastny et al. Patent No. 2,744,291 is difficult and expensive.

The method that is widely used for manufacturing articles, such as cups and receptacles, from conventional thermoplastic materials is injection molding. The reason for this is that injection molding permits the rapid, mass production of articles. An injection molding machine is cyclic in nature; the cycles of operation being repeated automatically and rapidly. A cycle may be as short as 4 seconds or less for small containers. The molding time, of course, is dependent on the size of the article and the heat capacity of the thermoplastic material used.

Injection molding machines are conventional and are described, for example, in Chapter 5 of the book entitled "Processing of Thermoplastic Materials" edited by Dr. E. C. Bernhardt, Reinhold Publishing Company, 1959. In such machines, the thermoplastic material is fed from a hopper into an injection cylinder as a plunger moves forward in the cylinder to commence the molding cycle; the plunger forcing the material through a heated portion of the injection cylinder where the material becomes a molten mass and then forcing the molten mass into a mold cavity to form the molded article.

In the production of single cups from conventional thermoplastic material, the molten mass flows through a nozzle into a mold that is conventionally comprised of a fixed and movable portion. The fixed portion or cavity of the mold is mounted on the fixed platen of the injection molding machine and defines the outer portion of the cup or container. Usually it has an opening with a sprue bushing and gate for the entrance of the molten mass from the cylinder, and is usually channeled for circulating heat transfer fluid. The movable portion or core of the mold is mounted on the movable platen of the injection molding machine and defines the inner portion of the cup or container. It also is generally channeled for the circulation of heat transfer fluid, and includes a system for removal of the article. The molten polymeric material enters the mold cavity by way of the gate, strikes the movable portion or core of the mold and flows through the cavity which forms the bottom of the cup, radially to the portion of the cavity that forms the outer periphery of the cup and then flows axially into the cavity that forms the sides of the cup. To harden the thermoplastic material and form the article, the material is allowed to harden. The article is made to stick to the core by differential shrinkage of the thermoplastic material caused by keeping the core at a lower temperature than the cavity. Thereafter, the mold is opened so that the article can be stripped from the core. As the article is freed from the mold, it activates a control to start another cycle of operation.

While the foregoing method is suitable for the production of cups and other receptacles from conventional thermoplastic materials, it is not feasible for the production of cups or other receptacles having a polymeric foam structure. For example, difficulties have been experienced in attempts to use such injection molding techniques to manufacture low-density cups or containers from expandable polymeric materials. With conventional equipment, the expandable polymeric material becomes heated and forms a highly viscous mass in the injection cylinder. Immediately upon leaving the nozzle, the mass starts expanding; but the cooling of the mass by the mold causes it to harden in the area near the gate so that this area soon becomes clogged. The mold cavity is, therefore, not completely filled or the pressure required to force the molden material into the mold is so great that the force of the expanding agent is overcome to such an extent that the expanding agent is not effective to produce a foam structure.

In accordance with this invention, a novel apparatus is provided for use with conventional injection molding machines for producing low-density articles from expandable thermoplastic polymeric particles by injection molding.

The invention contemplates a novel two-part mold, one part being fixed and the other part being movable relative to the fixed part. The fixed part is adapted to receive a molten thermoplastic mass from the nozzle end of an injection molding machine and by way of an aperture of frusto-conical shape flow the mass outwardly radially and longitudinally axially to the outer portion of the mold which defines the receptacle and which includes a core portion that defines the inner surface of the receptacle. The movable portion at a closed position relative to the fixed portion defines the outer surface of the receptacle and at the open position permits the article to be stripped from the core. A gate knife separates the molded article from the fixed part of the mold when the movable part is in the open position.

The foregoing and other objects and novel features of the invention will appear more fully from the detailed description when it is read in conjunction with the accompanying drawing. It is to be expressly understood, however, that the drawing is not intended to be a definition of the invention, but is for the purpose of illustration only.

In the drawing: wherein like parts are marked alike:

FIGURE 1 illustrates partially schematically and partially in section an embodiment of the invention incorporated with an injection molding machine;

FIGURE 2 is an end view of a portion of the fixed member of the novel mold of FIGURE 1;

FIGURE 3 is a partial section of an isometric view of an embodiment of a container made in accordance with the invention;

FIGURE 4 is an enlarged view of a cross-section of a container of FIGURE 3;

FIGURE 5 is a cross-section of the novel mold of FIGURE 1 illustrating details of the cut-off knife;

FIGURE 6 is an enlarged view of an embodiment of the movable member in cross-section; and FIGURE 7 is an enlarged view of the controlled opening C of FIGURE 1.

In a conventional injection molding machine 15, FIGURE 1, a metered amount of thermoplastic material feeds from a hopper 11 into the cylinder 13, and a plunger 21 moves forward in cylinder 13 forcing the particles of expandable thermoplastic polymeric material into the area of a heating unit 23, wherein the particles of polymeric material change into a molten mass and then forcing this mass through nozzle 25 into a mold which conforms the thermoplastic material to a desired shape. The mold at this time is in the closed position, but after piston 21 reaches its furthermost position to the right and is returned to its original position, the mold opens. As the mold reaches its furthermost position to the right, the cutter blades are actuated freeing the article; and the article is stripped from the mold. The movable portion of the mold moves to the left to a closed position. The cycle of operations is ready for commencement again.

The foregoing with the exception of the cutting operation is conventional; the controls and the machine for effecting the cycles of operation is well known and does not constitute a part of this invention.

The use of injection molding, with apparatus as was heretofore known, was not feasible to produce foam structures from particles of expandable polymeric material. The particles of expandable polymer, which had become fused into a viscous mass in the injection cylinder, started expanding immediately upon the mass leaving the nozzle. Due to the cooling of the polymeric mass and the direct impingement of the mass on the movable core face, the mold area near the nozzle soon became clogged, and the mold cavity was either not completely filled or the pressure required to force the molten material into the mold was so great as to overcome the expanding force of the expanding agent and, as a result, the expanding agent was not effective to produce a good foam structure.

In accordance with this invention, there is provided a novel mold 19 for attachment to an injection molding machine so that articles having a foam polymeric structure may be produced by injection molding apparatus. In accordance with this invention, a passage of a generally frustoconical shape flows the molten mass from the injection machine nozzle in a radial direction to the radial periphery of the mold cavity which forms the article. The material is forced through a controlled aperture axially along the outer periphery of the mold core and then radially inwardly to form the base of the container. After a predetermined amount of material has flowed in the mold, and the evolving period has ended, the mold is opened and the receptacle is stripped from the mold. The mold is then ready to commence another cycle of operation.

Turning now to FIGURE 1, the novel mold 19 has a fixed member 17 connected to the nozzle 25 of an injection molding machine and a movable member 18 adapted for movement relative to the fixed member 17. The elements of the injection molding machine upon which these members 17 and 18 are mounted do not constitute a portion of the invention, are conventional and, therefore, are not described. These mold members may be mounted on the injection molding machine by the conventional method well known in the art (such as by bolts and nuts).

Fixed member 17 is comprised of a mold backing plate 20 and a member 22 having an angular or frustoconical face with a plurality of webs 31 projecting therefrom. Temperature controlling channels 37 in member 22 permit the flow of a heat transfer fluid, such as water, therethrough to control the temperature. Webs 31 serve to support and position a core 33 whose face is correspondingly frustoconical in shape relative to member 17 so as to provide an annular opening C between core 33 and member 22. This aperture C is of a frustoconical nature and is advantageously narrower than the width of the receptacle to be made with the mold. By throttling the upper portion of the annular space, FIGURE 7, the flow can be adjusted to give different densities of final product to different receptacles if desired, since the size of this opening allows the material leaving the aperture to expand upon entering the mold cavity. It controls the difference in pressure between the inside of the aperture and the mold cavity.

Movable member 18 has a substantially cylindrically slender shape for cooperating with core 33 to form a cavity of the desired shape for a container, for example, as illustrated in FIGURE 3. Movable portion 18 is mounted by means of a mold-backing plate 30 on a conventional movable section of the injection molding machine. Space 35 in member 18 provides for the flow of fluid to cool the receptacle.

Extending from fixed member 17 into the core 33 through the webs 31 are conduits supplying air to the core by way of a common conduit 39, thereby permitting a blast of air to pass through the core to strip or eject the article from the core. This blast of air is controlled by the valves 29, (a), (b) which are conventional parts. The common conduit may also act as a source of vacuum to remove the gases from the mold cavity so as to increase the difference in partial pressure between the material flow system and the mold cavity, and to remove gases which might cause oxidation or retard the flow of material into the cavity. Knives 27 are attached to the mold backing plate fixed to the frame of the injection molding machine and are activated by a valve (not shown) which is actuated when movable member 18 moves backward and forward so as to open and close the aperture opening and cut the molded container from the fixed core.

In the embodiment illustrated in FIGURE 6, member 19 is also provided with a vent 50 which extends outwardly through the mold backing plate 30 to further vent the gases from the mold.

In the operation of the novel apparatus for the injection molding of polymeric particles, the hopper 11 is loaded with particles of expandable thermoplastic material such as "Dylite" expandable polystyrene (which contains from 5–15 parts by weight of petroleum ether). The movable member 19 is moved forward or leftwardly so that face A of part 18 contacts face A of part 17. As the movable member is moved forward, the knives 27 are withdrawn from the mold face. This closes the mold and forms a cup-shaped cavity between core 33 and movable member 18. Plunger 21 moves forward to force a metered amount of expandable polymeric particles into the heated area 23, where the particles melt to form a molten mass, and thence through nozzle 25 into the opening C between member 17 and core 33. The knives 27 are now in the open position shown in FIGURE 5. The hot water in channels 37 of member 17 maintains the material hot in this area. The material flows through annular opening C into the cavity between core 33 and member 19 until the cavity is completely filled. Any gas released at this time is vented either through the common conduit 39 in FIGURE 1 or in the embodiment of FIGURE 6 through the vent 50. Cooling fluid passes through opening 35 of the movable part 18. The mold is allowed to remain in the closed position for a period of time sufficient to harden the article in the mold, for example, 5 seconds, to permit the material to set to retain the shape of the cavity. Thereafter member 18 moves outwardly to open the mold. The knives 27 are actuated to sever the molding from the core. Air from valves 29 is passed through webs 31 through common conduit 39 to strip the formed container from core 33. The container so formed then bears a configuration, for example, such as shown in FIGURE 3. Upon the stripping of the container from the core, the container trips a control (not shown) as it is common in the art, to start the cycle of operation again.

The molten material adjacent the cold surface of member 19 and core 33 forms a relatively continuous outer layer 40. The remainder of the material expanding within this layer forms therewith the foamed core structure 43. Thus, a container made in accordance with this invention is light in weight, has a high insulation value, has a surface which is relatively impermeable to fluids, and is more chemically resistant than conventionally molded expandable polystyrene.

The foregoing has shown the production of a container having flat bottoms and flat sides, but it is obvious to those skilled in the art that the invention is not limited to such configuration. The bottom of the container, for example, may be rounded and the sides may be fluted, threaded, or otherwise shaped. The top, while shown herein as smooth, may be formed so as to have threads thereon as the threading of a cap to provide a closed container.

While the foregoing has discussed particularly foamed polystyrene and expandable polystyrene, other expandable thermoplastic resinous materials well known to the art are employed. Typical materials include vinyl toluene, the several chlorostyrenes (such as mono- and dichlorostyrene), and those materials which may be comprised of polymers and copolymers of methyl methacrylate, such as its homopolymer and the copolymers thereof with vinylidene chloride; thermoplastic polymers and copolymers of vinyl chloride, including homopolymeric vinyl chloride, various thermoplastic, expandable natural and synthetic rubber compositions; thermoplastic expandable ester and ether derivatives of cellulose including cellulose acetate, cellulose propionate, cellulose acetate butyrate, ethyl cellulose, and the like, cellulose nitrate; expandable thermoplastic olefin polymers and copolymers, particularly those from nonaromatic hydrocarbon olefins, such as polyethylene, polypropylene, copolymers of ethylene and propylene, and the like; and chlorinated polyolefins such as chlorinated polyethylene, etc., and the like.

It is claimed:

1. A process for producing a foamed polymeric cup-shaped article having a base and a substantially cylindrical side, which comprises flowing a volume smaller than the volume of the mold of molten expandable but unexpanded polymeric material from an injection molding machine into the periphery of a cup-shaped mold cavity through a conical channel such that said material expands, flowing said expanding material along the side of said cup-shaped mold cavity, and flowing said expanding material to the base of said cup-shaped mold cavity while simultaneously removing gas from said cavity, thereafter cooling said material to a temperature at which the material becomes self-supporting, and removing the article from the mold.

2. A process for producing a foamed polymeric cup-shaped article having a base and a substantially cylindrical side, which comprises flowing a volume smaller than the volume of the mold of molten expandable but unexpanded polymeric material from an injection molding machine into the periphery of a cup-shaped mold cavity through a conical channel such that said material expands, flowing said expanding material axially along the sides of the mold cavity and then radially inwardly to the base of said cup-shaped mold cavity while simultaneously removing gas from said cavity, thereafter cooling said material to a temperature at which the material becomes self-supporting, and removing the article from the mold.

3. Apparatus for producing a foamed polymeric cup-shaped article having a base and an integral substantially cylindrical side which comprises a mold adapted to be positioned adjacent the injection nozzle of an injection molding machine, said mold having a cup-shaped mold cavity, a conical channel operatively associated with said injection nozzle and said mold cavity for flowing expandable polymeric material from said injection nozzle to said mold cavity, whereby said expandable material expands to a foamed structure as it flows along the side of said cup-shaped mold cavity and to the base of said cup-shaped mold cavity, means for removing gas from said cavity to allow said expandable material to fill said cavity, means adjacent the injection duct for heating the expandable material, means for cooling said expandable material after it has expanded, and means for removing the article from the mold.

4. Apparatus for producing a foamed polymeric cup-shaped article having a base and an integral substantially cylindrical side which comprises a mold adapted to be positioned adjacent the injection nozzle of an injection molding machine, said mold having a cup-shaped mold cavity, a conical channel operatively associated with said injection nozzle and said mold cavity for flowing expandable polymeric material from said injection nozzle to said mold cavity, whereby said expandable material flows along the side of said cup-shaped mold cavity and to the base of said cup-shaped mold cavity, means for removing gas from said cavity to allow said expandable material to fill said cavity, a cut-off knife comprised of two semicircular elements mounted for reciprocal movement transverse to and between said conical channel and said mold cavity for stopping the flow of molten material from the conical channel to the mold cavity, means adjacent the injection duct for heating the expandable material, means for cooling said expandable material after it has expanded, and means for removing the article from the mold.

5. Apparatus for producing a foamed polymeric cup-shaped article having a base and an integral substantially cylindrical side which comprises a mold adapted to be positioned adjacent the injection nozzle of an injection molding machine, said mold having a cup-shaped mold cavity, a conical channel operatively associated with said injection nozzle and said mold cavity for flowing expandable polymeric material from said injection nozzle to said mold cavity, whereby said expandable material flows axially along the side of said cup-shaped mold cavity and then radially inwardly to the base of said cup-shaped mold cavity, means for removing gas from said cavity to allow said expandable material to fill said cavity, means adjacent the injection duct for heating the expandable material, means for cooling said expandable material after it has expanded, and means for removing the article from the mold.

References Cited in the file of this patent

UNITED STATES PATENTS

Re. 24,784 Sherman _____ Feb. 16, 1960
2,175,053 Ferngren _____ Oct. 3, 1939

(Other references on following page)

UNITED STATES PATENTS

| | | | |
|---|---|---|---|
| 2,360,023 | Tucker | Oct. 10, | 1944 |
| 2,431,349 | Stacy | Nov. 25, | 1947 |
| 2,476,884 | Maynard | July 19, | 1949 |
| 2,478,005 | Novotny | Aug. 2, | 1949 |
| 2,637,882 | Plott | May 12, | 1953 |
| 2,668,985 | Babbitt | Feb. 16, | 1954 |
| 2,797,443 | Carlson | July 2, | 1957 |
| 2,801,444 | Lorenian | Aug. 6, | 1957 |
| 2,951,260 | Harrison et al. | Sept. 6, | 1960 |
| 3,013,308 | Armour | Dec. 19, | 1961 |
| 3,058,161 | Beyer et al. | Oct. 16, | 1962 |
| 3,090,994 | Stenger | May 28, | 1963 |

OTHER REFERENCES

Modern Plastics, "New Techniques for Processing Expandable Styrene Foam," September 1960, pp. 113–115 and 202.